(12) United States Patent
Kennedy et al.

(10) Patent No.: US 7,034,670 B2
(45) Date of Patent: Apr. 25, 2006

(54) METHOD OF OCCUPANCY CLASSIFICATION IN A VEHICLE SEAT

(75) Inventors: Karl Kennedy, Fraser, MI (US); John F. Nathan, White Lake Township, MI (US); Christopher T. Ricard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 203 days.

(21) Appl. No.: 10/748,504

(22) Filed: Dec. 30, 2003

(65) Prior Publication Data
US 2005/0149461 A1    Jul. 7, 2005

(51) Int. Cl.
*B60Q 1/00*      (2006.01)
*B60K 28/04*    (2006.01)
*G06E 3/00*     (2006.01)

(52) U.S. Cl. .................. 340/438; 340/667; 200/85 A; 180/273; 706/20; 702/101; 702/129

(58) Field of Classification Search ................ 340/438; 200/85 A
See application file for complete search history.

(56) References Cited

U.S. PATENT DOCUMENTS

| | | | |
|---|---|---|---|
| 5,377,108 A | 12/1994 | Nishio | 364/424.05 |
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,583,771 A | 12/1996 | Lynch et al. | 364/424.045 |
| 5,594,222 A | 1/1997 | Caldwell | 200/600 |
| 5,653,462 A | 8/1997 | Breed et al. | 280/735 |
| 5,684,701 A | 11/1997 | Breed | 364/424.055 |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |

(Continued)

FOREIGN PATENT DOCUMENTS

EP       0 689 967 A1    3/1996

(Continued)

*Primary Examiner*—Donnie L. Crosland
(74) *Attorney, Agent, or Firm*—Bill Panagos

(57) ABSTRACT

A method of recognizing and classifying the occupancy in a vehicle seat having an occupancy sensing system, including the steps of sensing the output of an array of sensors that detect a physical presence in a seat and applying the sensor array output as a vector representation to a neural net that was trained using a learning vector quantization algorithm. The method also includes the step of recognizing the sensor array output as falling within one of a group of predetermined classification patterns that represent a physical presence in the seat defined by size, weight, and physical orientation.

12 Claims, 7 Drawing Sheets

U.S. PATENT DOCUMENTS

| | | | |
|---|---|---|---|
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,532,408 B1 | 3/2003 | Breed | 701/45 |
| 6,605,877 B1 | 8/2003 | Patterson et al. | 307/10.1 |
| 6,609,054 B1 | 8/2003 | Wallace | 701/45 |
| 6,615,122 B1 | 9/2003 | Yamashita | 701/45 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |

FOREIGN PATENT DOCUMENTS

| | | |
|---|---|---|
| WO | WO 98/41424 | 3/1997 |

METHOD OF OCCUPANCY CLASSIFICATION IN A VEHICLE SEAT

BACKGROUND OF THE INVENTION

1. Field of the Invention

The present invention relates, generally to the recognition of a physical presence in a seat and, more specifically, to a method of recognizing and classifying the occupancy of a vehicle seat having an occupancy sensing system.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

The sensors are arranged into a grid, or an array so that the sensors are collectively used to provide the raw input data as a depression or deflection pattern in the seat cushion. In this manner, systems of the type known in the related art take the data from the sensor array and process it, by a number of different means, in an attempt to determine the physical presence in the seat. A number of the prior art systems sense the defection of portions of the vehicle seat and attempt to discern from the sensor array data a recognized pattern that corresponds to one of the specified occupant classifications. To accomplish the pattern recognition, the best of these newer systems take the data derived from the sensed seat occupancy and process it through an artificial neural network (ANN). ANNs are more commonly referred to as neural networks, or simply, neural nets.

In general terms, a NN is essentially an interconnected assembly of simple processing element units, or nodes. The processing ability of the network is stored in the inter-unit connection strengths, or weights, obtained by a process of adaptation to, or learning from, a set of training patterns. The NN may simply have an input and an output layer of units, or have an additional "hidden" layer or layers of units that internally direct the interconnection processes. The benefit to employing a NN approach is that, if properly trained, the NN will be able to generalize and infer the correct output responses from limited input data. Specifically in the case at hand, the NN based occupancy sensing systems determine that a physical presence is in a vehicle seat, recognize the type of physical presence by the sensor pattern it presents and pass this information to a restraint system control to determine if the pattern classification requires deployment or suppression of the airbag or other restraints.

Since a wide variety of individuals and objects (baby seats, for example) may be occupying a vehicle seat in a variety of seating positions, it is necessary to sort through a myriad of sensor array pattern inputs. However, for purposes of providing control inputs to a supplemental restrain system these large numbers of inputs from the sensor array are classifiable into a relatively small number of categories or classifications. When a NN to employed as a classification device for the variety of possible inputs, the NN must first be trained to understand the data it will receive. This is known as "supervised" learning, where the NN is provided both an input and the desired result. Supervised learning may be applied to a number of different known types of NNs, but the current methods used for classifying vehicle seat occupancy use one of the most common methodologies of "error back-propagation".

In error back-propagation, which is known more simply as back-propagation (BP), the NN employs a "learning" rule whereby the weights of the unit connections are adjusted on the basis of the training data. The learning rule is essentially the algorithm used in the BP NN that will be the basis for deciding on how to classifying the actual incoming data, once the training is completed and the NN is put into use. During the training of a BP NN, the difference between the desired result and the actual output result of the NN for the given input provides an error that is used to adjust the connection weights. Changing the weights of the connections brings the NN results closer to the target result. The process of "back propagating" the determined "error" to adjust the connection weights gives this methodology its name. After training, the BP NN is tested, or validated by giving it only input values and seeing how close it comes to outputting the correct target values. The training may be continued if the validation of the BP NN does not give the desired results.

While the use of back propagation in a NN is relatively well established and it is one of the most commonly employed NN methodologies, it has distinct disadvantages when used in a NN for pattern recognition and classification. Back propagation causes the NN to learn specific target results rather than grouping the results into clusters or classifications. While this is useful and provides flexibility in many different applications, using a BP NN for pattern recognition and classification causes the BP NN to be confused and give non-sequitur results when attempting to classify a wide variety of possible inputs into relatively few target clusters of results, or classifications. In other words, the BP NN can be almost unbounded in its establishment of the number of possible results for the input data it processes, and even if it is limited to a specific number of outputs, it is unable to group a wide variety of somewhat similar results into clusters that are define as a class. Thus, when a BP NN based system is used for pattern recognition and classification, a series of additional steps are required to redefine all the specific targets results into the desired pattern recognition classifications. A number of the current occupant classification systems employ extensive filtering and reforming of the data in and out of a NN to achieve better results with a BP NN. This is inefficient and introduces errors that cannot be compensated for. Secondarily, in a pattern recognition and classification application, the unbounded nature of a BP NN causes slow, tedious training with a correspondingly slow decision and computational process when put into practice.

In regard to the clustering of output data into groups, it is known to use "unsupervised" learning with certain types of NNs to produce output clustering of data. Generally speaking in these cases, the NNs is provided with input data but not with target output data. Thus, the NN uses its learning algorithm and connection weighting to group the results it gets into clusters of similar results. This, by itself, does not work well for pattern recognition and classification as the "unsupervised" NN provides its own groupings rather than any that might be desired and pre-determined. Thus, while well-designed NNs can perform complex decision-making from a wide variety of data inputs, the current methods of using a back propagation NN for classifying the occupancy of a vehicle seat are inefficient and often contain hidden computational errors. Furthermore, other NNs employing unsupervised learning can group the resultant outputs but cannot separate the results into any predetermined classifications.

Accordingly, there remains a need in the art for a method of occupant classification for a vehicle seat that employs a NN that is trained by supervised learning to define a predetermined a set of classifications, and that is also capable of processing any available input data and separating the resultant output into predetermined classifications.

SUMMARY OF THE INVENTION

The disadvantages of the related art are overcome by the method of the present invention for recognizing and classifying a physical presence occupying a seat. The method includes the steps of sensing the output of an array of sensors that detect a physical presence in a seat, then applying the sensor array output to a trained neural net having a predetermined learning vector quantization algorithm. Further, the method includes recognizing the sensor array output as one of a variety of predetermined classification patterns that represent a physical presence in the seat defined by size, weight, and physical orientation.

Thus, the present invention overcomes the limitations of the current methods of pattern recognition and classification for vehicle seat occupancy that use neural nets by providing a control method that employs a trained neutral net having a learning vector quantization algorithm. In addition, the method of the present invention overcomes the limitations of the current methods by properly training a NN with an LVQ algorithm to provide accurate pattern recognition and occupancy classification for a vehicle seat having an occupancy sensing system.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
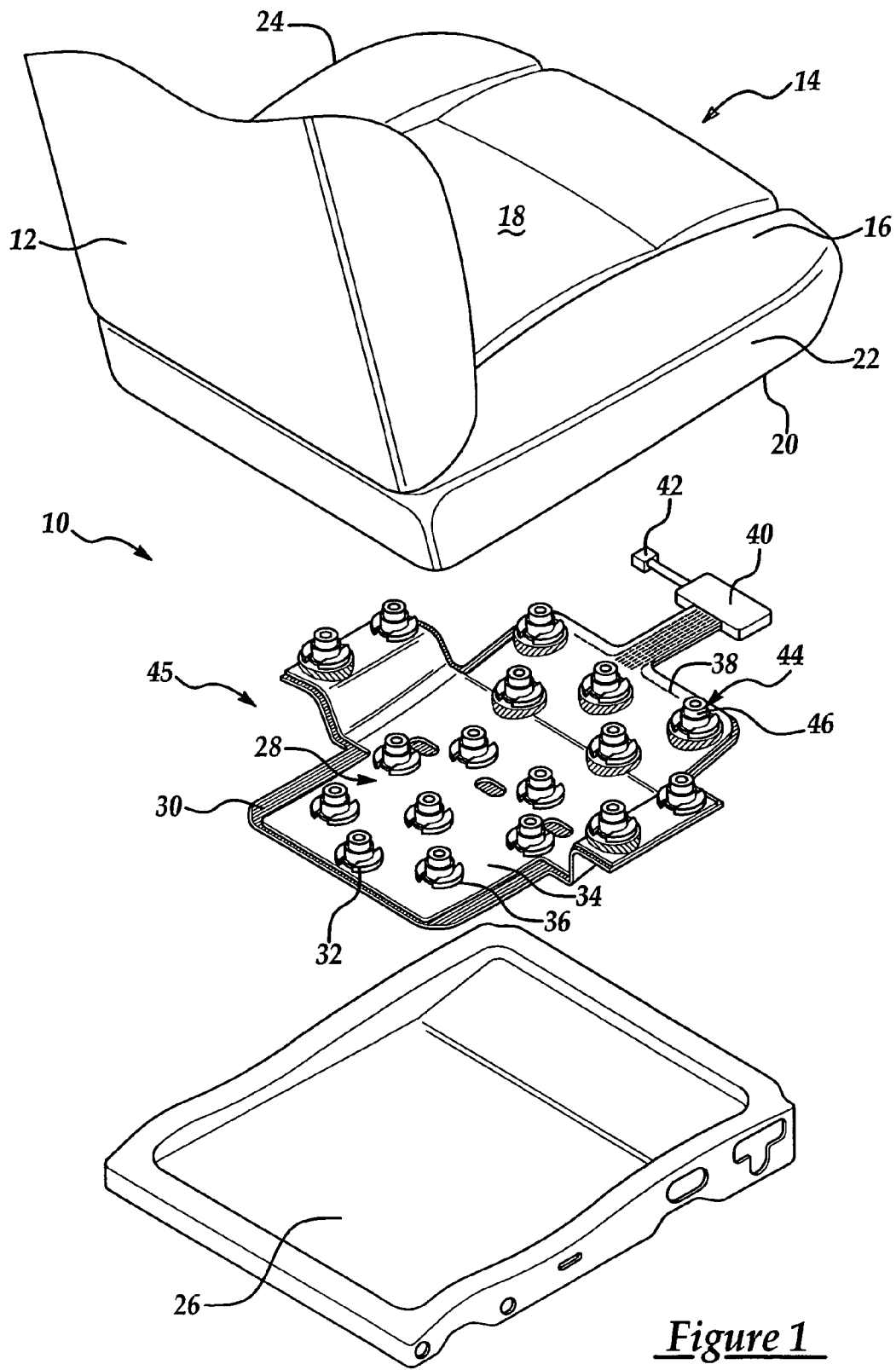
FIG. 1 is an exploded view of a vehicle seat having a sensor array used for occupancy classification of the type that may be employed with the method of the present invention to predict an empty seat condition.

Referring now to the drawings, where like numerals are used to designate like structure throughout the figures, an exploded view of one example of a vehicle seat assembly having an occupancy sensing system that may be employed with the method of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38. The circuit 38 is electrically connected to a controller schematically illustrated at 40. The electric circuit 38 carries electric signals generated by the vehicle occupant sensing system 28 to the controller 40. The controller 40 is electrically attached to a supplemental restraint system (SRS), schematically illustrated at 42. The restraint system 42 can be of many types, such as an air bag system, and the controller 40 controls the restraint system 42 based on the signals delivered by the electric circuit 38. Although an airbag restraint system is discussed here, one having ordinary skill in the art will recognize that the type of restraint system 42 connected to the controller 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45. As will be discussed in greater detail below, the particular sensor assemblies 44 shown herein have a relatively low profile and can collapse in a more compact manner than similar sensor assemblies of the prior art. Advantageously, these low profile sensor assemblies 44 allow an occupant to sit more comfortably upon the vehicle seat 10.

Figure 2:
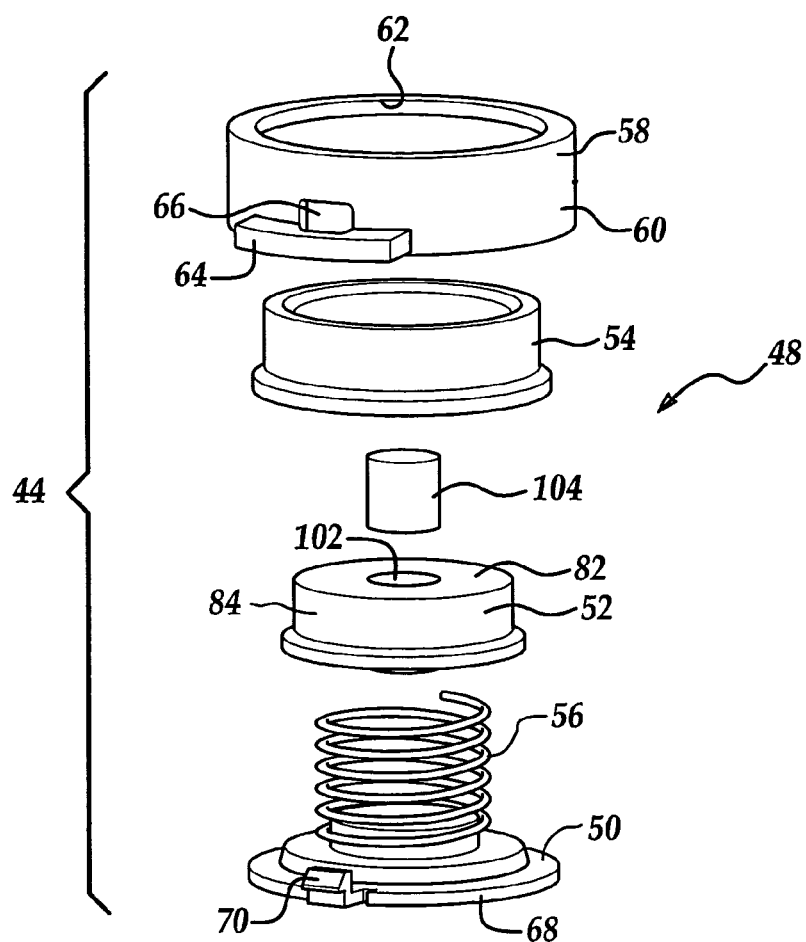
FIG. 2 is an exploded view of a sensor from the sensor array of FIG. 1.

A sensor, generally indicated at 46, is operatively fixed relative to each of the low profile sensor assemblies 32. The sensor 46 is in electrical communication with the electric circuit 38. One example of a low profile sensor assembly that may be employed with the method of the present invention is shown in greater detail in FIGS. 2 and 3. The low profile sensor assembly 44 generally includes a housing 48, having a base 50, an upper slide member 52, an intermediate guide member 54, and a base guide 58. The intermediate guide member 54 is disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50.

The base guide 58 is shaped like a hollow tube so as to define a wall 60 with a bore 62 extending axially there through to allow for axial movement of the intermediate guide member 54. The base 50 also includes a retainer portion 68, which is substantially disc-shaped and is attached to one terminal end of the base guide 58. Two resilient tabs 70 extend radially and upward from an outer circumferential edge of the retainer portion 68. The tabs 70 are spaced 180° apart from each other. To connect the retainer portion 68 and the base guide 58, the retainer 68 moves axially into the bore 62 of the base guide 58 such that the tabs 70 of the retainer 68 snap into the apertures 66 of the base guide 58.

Figure 3:
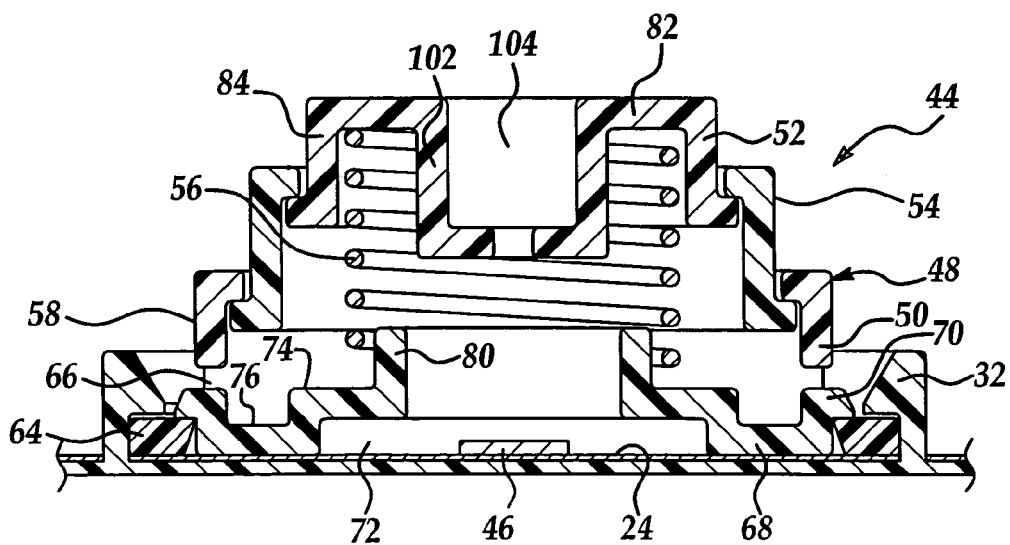
FIG. 3 is a cross-sectional view of the sensor of FIG. 2.

The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52. As shown in FIG. 3, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. To attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32.

An annular void 72 is formed near the axial center of the base 50. As shown in FIG. 3, the sensor 46 is a Hall effect sensor attached to the circuit carrier 34 between each pair of tabs 32 of the tray 30. The upper disc portion 82 of the upper slide member 52 includes a retainer portion 102 that accepts and retains an emitter 104, such as a magnet. The magnet thereby moves in axial relationship to the sensor 46 that is disposed upon and in electrical communication with the electric circuit 38. Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 controls the restraint system 42 based on these signals. The sensor assembly 44 is described in greater detail in a co-pending application, Ser. No., 10/748,536 entitled "Vehicle Occupant Sensing System Having a Low Profile Sensor Assembly," which is hereby incorporated in its entirety by reference. The electrical attachment between the sensor 46 and the circuit carrier 34 can be accomplished in the manner described in a co-pending application, Ser. No. 10/748,514, entitled "Vehicle Occupant Sensing System and Method of Electrically Attaching a Sensor to an Electrical Circuit," which is hereby incorporated in its entirety by reference.

In this manner, the sensor array assembly 45, through the combined output of the sensors 46 forms a portion of a vehicle seat occupancy sensing system that is associated with the supplemental restrain system (SRS) 42. The sensor array 45 is utilized to provide data to a neural net, which classifies the pattern generated by the sensor array 45 to allow the SRS control system to activate or suppress the deployment of the airbags. More specifically, when a physical presence occupies the vehicle seat, the collective sensor outputs of the sensors 46 in the sensor array 45 produce a particular pattern that the NN recognizes as belonging to a certain group of patterns (i.e. a cluster or classification). If the pattern is one that falls into a classification that it has been predetermined that it is desirable to deploy the airbag in the event of an impact, the SRS control system will be prepared to do so. If the pattern is one that falls into a classification that it has been predetermined that it is not desirable to deploy the airbag in the event of an impact, the SRS control system will take steps to suppress the deployment. Furthermore, the classification of the recognized pattern also provides the SRS control system with the capability to control the rate and percentage of airbag deployment if the SRS system is so designed.

As previously discussed, some prior art occupancy sensing systems have employed NN processing to attempt to discern the occupancy of a vehicle seat. However, the prior art systems employ NN approaches that are generally inadequate for the pattern recognition and classification needs of an occupancy sensing system having a sensor array. The conventional NN approaches use "unsupervised" networks, also known as "self-organizing networks" or SOMs, meaning self-organized mapping. Self-organizing networks rely only on input data and try to find structures in the input data space to define the output. The "unsupervised" term relates to the training of the NN. How the NN is trained is key to the manner in which it operationally processes data. In unsupervised training, the training algorithm provides the NN with inputs but no desired output classes or grouping. Therefore, since there is no "correct" or "incorrect" output "answers" the training is unsupervised and the NN itself is free to develop it own class boundaries.

Figure 4:
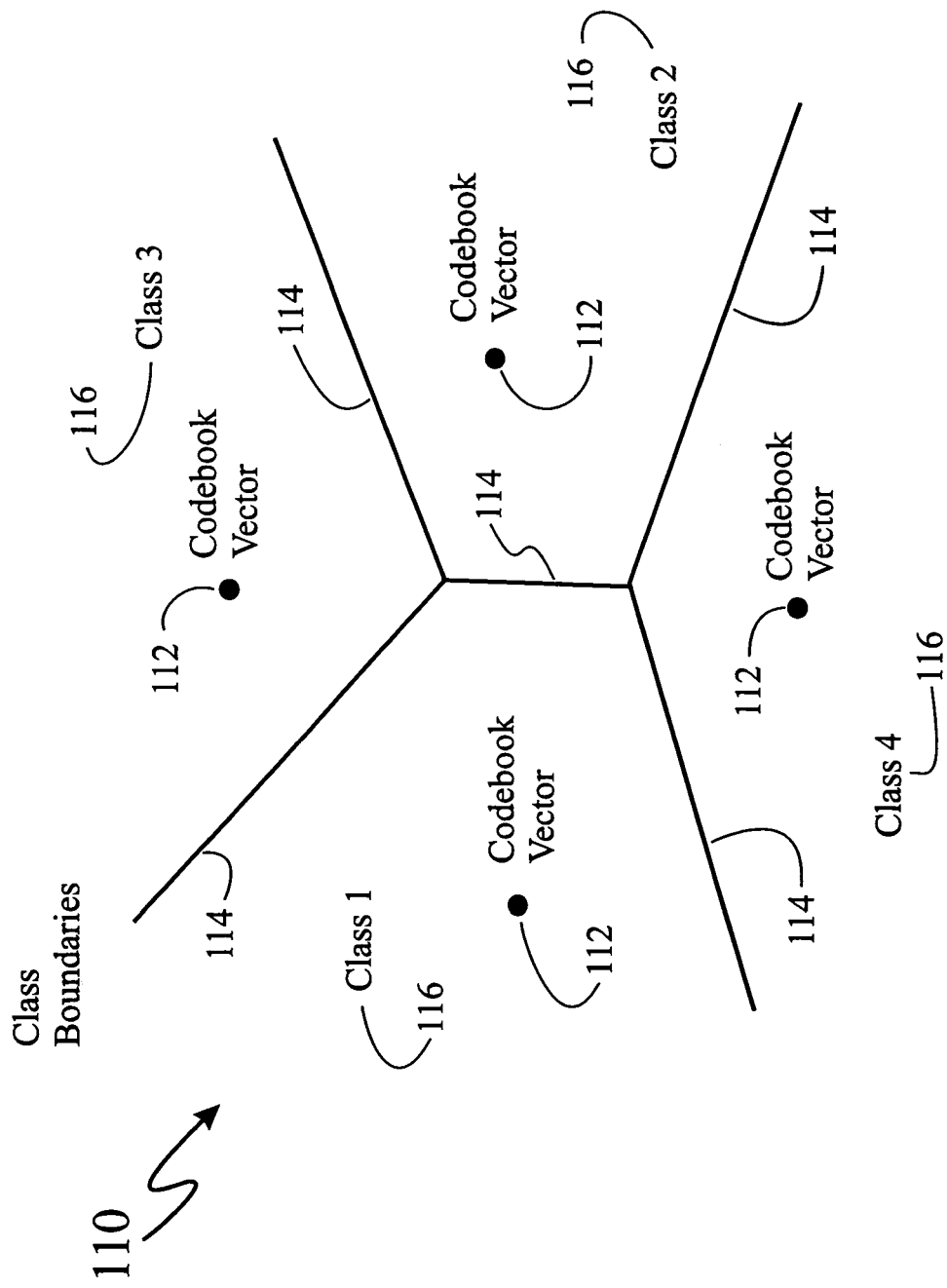
FIG. 4 is a schematic illustration of the output classes of a neural net trained with an unsupervised training method.

The unsupervised training of the NN results in the development of a large number of outputs in the form of vector expressions that have mathematical components representing direction and magnitude. These vector expressions represent the output classes and are known as codewords. The set of codewords form the vector codebook. Together, the codewords not only define the various classes in the group they also define the associated class boundaries. Thus, the codewords are more commonly referred to as codebook vectors. When unsupervised NNs are employed for pattern recognition, the input is supplied as a vector expression and the output is matched to one of the set of stored codebook vectors and the best match is chosen. In this sense, a best match refers to identifying the stored codebook vector of which the processed vector expression is closest to in Euclidean distance. As an example, FIG. 4 graphically illustrates an unsupervised NN generally indicated at 110. A series of codebook vectors 112 have defined boundaries 114 that represent four classes 116. The unsupervised training produces only one codebook vector for each class. Due to the unsupervised training, these types of NN can become essentially unbounded by producing a large number of classes where only a small number is desired in pattern recognition applications. As previously mentioned, other conventional NN approaches in occupancy sensing systems employ supervised networks using error back propagation (BP). While the BP NNs having supervised training offer improvements over the unsupervised NNs, they still suffer from the same general drawbacks in terms of unbounded classes or classifications. More precisely, even though BP NNs train on specific data inputs to yield specific output results, they do not develop groups or classes of output results to deal with similar but un-trained data inputs when operational.

The method of the present invention employs another type of NN that has some similarities to both the unsupervised and supervised types. The NN that employs the method of the present invention is a Learning Vector Quantization (LVQ) network that is specifically used for pattern recognition and classification. This particular type of NN uses supervised training to establish its codebook vectors and classes and then "learns" by adjusting its output boundaries to fit the desired classes. Like unsupervised networks, the LVQ network is based on a set of codebook vectors. Each class also has a subset of the codebook vectors associated to it. The positions of the codebook vectors are obtained with a supervised training algorithm. In this case, a specific training set of vector input samples are provided to the NN with the goal of producing specific resultant outputs. Then the codebook vectors, also referred to as output units are adjusted by additional weight vectors to provide the desired outputs and class boundaries. As with the other types of NNs, the LVQ NNs may have somewhat different structures depending upon the specific application. It should be appreciated that the method of the present invention is not limited by any particular LVQ NN structure.

Figure 5:
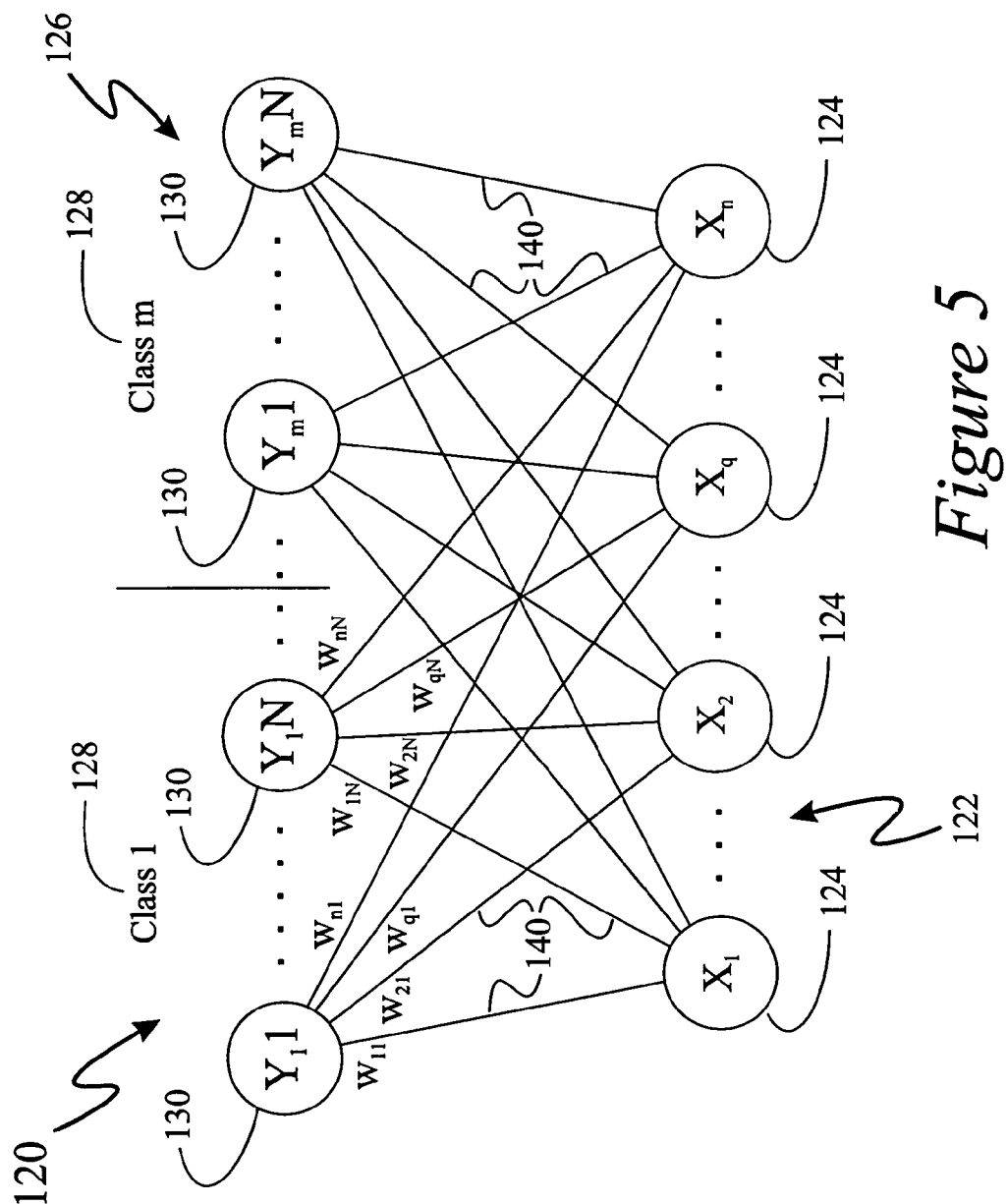
FIG. 5 is a schematic illustration of a neural net of the type that may be employed with the method of the present invention.

By way of non-limiting example, FIG. 5 graphically represents a portion of an LVQ NN that may be employed by the method of the present invention. The LVQ NN is generally indicated at 120 and has an input layer 122 with "$X_n$" number of input modes 124 and an output layer 126 that has "m" number of classes 128. For the NN 120 illustrated in FIG. 5, each class 128 has at least two output nodes 130. The output nodes 130 are representations of the codebook vectors that define the classes 128. As shown, each codebook vector may or may not have additional vector weights "W" added to the node interconnections 140. The weights are added during the training to further define the Euclidian position of the codebook vectors and thereby the class boundaries. In this manner, during the training of the LVQ NN the boundaries of the classes will change their shapes and sizes to reflect the greater weights given to some of the output units over others with respect to the inputs. To better define the class boundaries, more than one codebook vector is defined for each class.

When training the LVQ NN so that it may be employed with the method of the present invention, vector expressions from the output of the sensor array 45 are presented to the NN and the interconnections to the output units are weighted to "learn" to produce the desired responses. This "learn by example" strategy that uses specific inputs to develop the desired responses in the classification model is the "supervised" training approach. It should be appreciated that the raw data from the sensors 46 may need to be preprocessed in some manner as to make it compatible to input to the NN. This generally requires at least a simple analog to digital conversion and formatting to vector terms, but may also include other filtering processes. These input vector expressions from the sensor array correlate to the physical depressions formed in the vehicle seat by the particular classes of individuals occupying the vehicle seat in any of a variety of seating positions. The specific training of the NN will be discussed in greater detail below. However, it should be appreciated that the actual physical forms may be placed in a representative seat having the occupancy sensing system to generate the sensor outputs from the array or the representative vector expression may be directly input to the NN as mathematical data. Regardless, the training of the NN to an LVQ algorithm produces the type of LVQ NN that is employed with the method of the present invention. More specifically, after training the LVQ NN, the method of the present invention uses the NN for recognition and classification of a physical presence occupying a vehicle seat having an occupancy sensing system.

Figure 6:
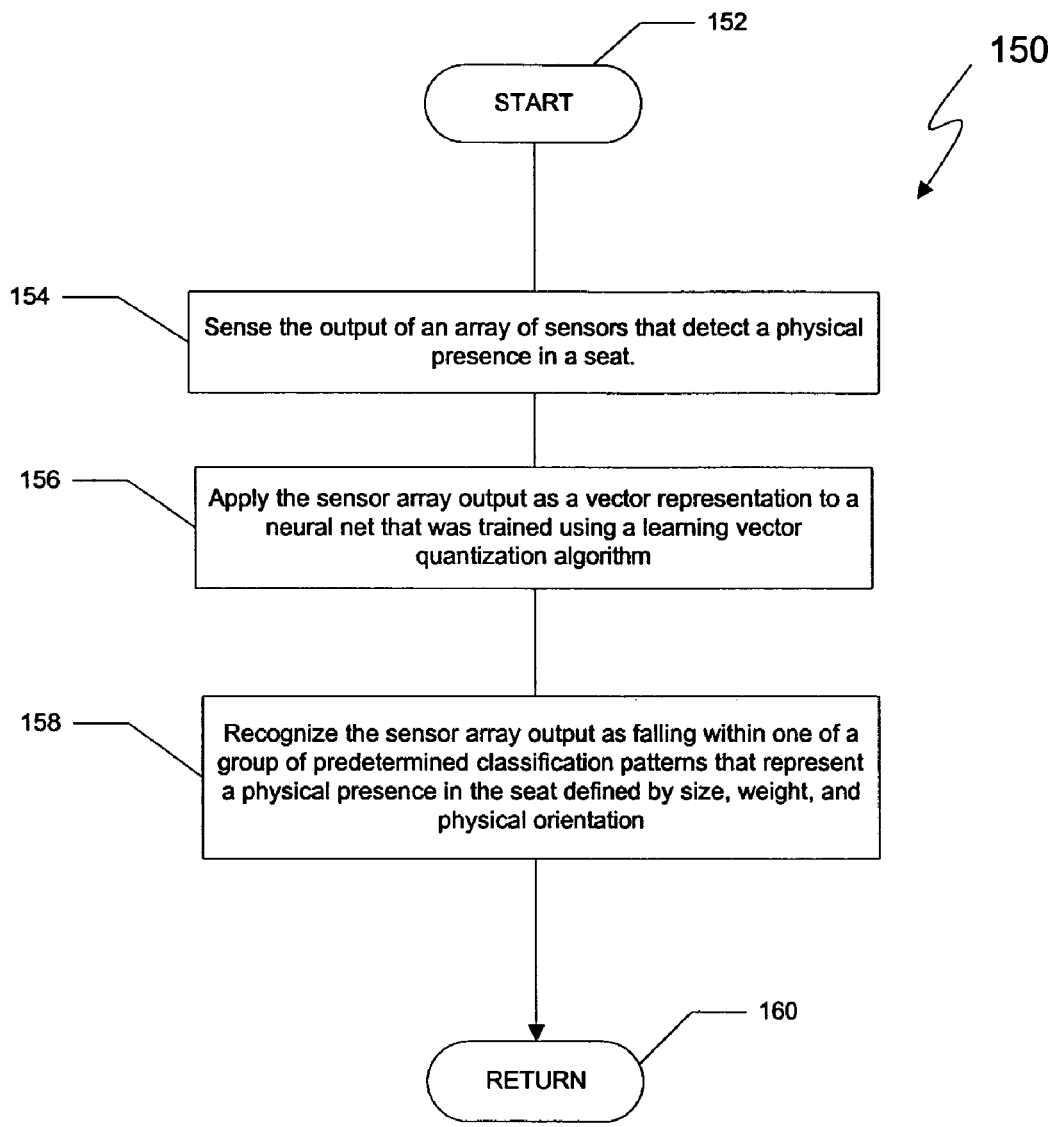
FIG. 6 is a block diagram flowchart of the method of the present invention for recognizing and classifying the occupancy in a vehicle seat having an occupancy sensing system.

The method of the present invention will be described in general with reference to the flow chart generally indicated at 150 in FIG. 6. The method steps begin at start entry block 152 and continue to process block 154. Process block 154 senses the output of an array of sensors that detect a physical presence in a seat. Process block 156 continues and applies the sensor array output as a vector representation to a neural net that was trained using a learning vector quantization algorithm. Further, process block 158 then recognizing the sensor array output as falling within one of a group of predetermined classification patterns that represent a physical presence in the seat defined by size, weight, and physical orientation. The method finishes at the end return block 160. It should be appreciated that this is an on-going repetitive process and after reaching the end return block 160, the method is restarted and the start entry block 152.

Figure 7:
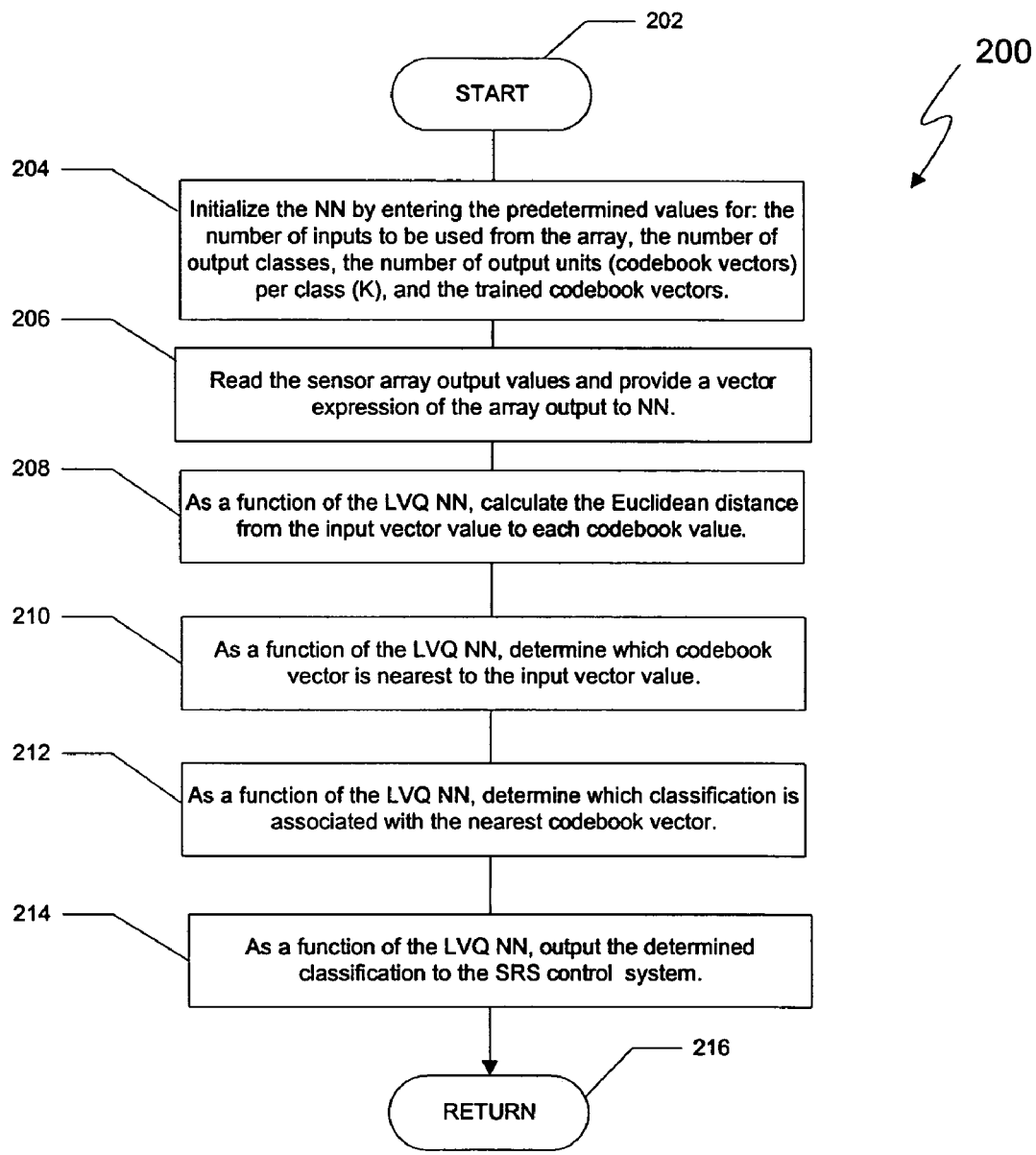
FIG. 7 is a detailed block diagram flowchart of the method of the present invention for recognizing and classifying the occupancy in a vehicle seat having an occupancy sensing system.

FIG. 7 illustrates additional detailed steps that may be included in the method of the present invention. The detailed steps of the method are generally indicated at 200 and begin at the start entry block 202. Process block 204 continues by initiating the NN. Certain predetermined values that will be used by the NN to process the sensor array data are entered into the NN at process block 204. These predetermined values include: the number of inputs (i.e. individual sensors 46) that will be used in the array, the number of output classes, the number of output units (codebook vectors) per each class (expressed as K), and the trained codebook vectors themselves. It should be appreciated that the loading of these initial values need not be repeated each time the method repeats and re-determines an occupancy classification, but they may be required for each vehicle start if the information is not permanently stored in the NN. The method continues at process block 206, which reads the output of the sensor array and provides a vector expression of that output to the NN.

Once process block 206 provides the sensor array data to the NN, the NN calculates the Euclidean distance of the vector expression input to each codebook vector as represented in process block 208. At process block 210, the NN determines which codebook vector is closest to the input vector expression. Then, in process block 212, the NN determines which of the predetermined classifications are associated with the nearest codebook vector. Once the classification is determined, the NN outputs that information to the SRS control system for its use in control of the deployment of the restrain system as shown at process block 214. The method finishes at the end return block 216. It should be appreciated that this is an on-going repetitive process and after reaching the end return block 216, the method is restarted at the start entry block 202. In this manner, the method employs a properly trained LVQ neural net for pattern recognition and classification of the occupancy of a vehicle seat having an occupancy sensing system.

To achieve this end result, the method of the present invention also includes steps to properly train the NN with an LVQ strategy. This portion of the method of the present invention will be described with reference to the flow chart generally indicated at 230 in FIG. 8. The method of the present invention sequentially employs two LVQ training algorithms to train the LVQ NN to the high degree of accuracy that has been unattainable in prior art method approaches and is needed for pattern recognition and classification of occupancy in a vehicle seat. In the preferred embodiment of the present invention, training algorithms LVQ1 and LVQ2 are employed in training the NN. LVQ1 is utilized first for generally shaping the boundaries of the classes by weighting and moving the codebook vectors individually. LVQ2 is utilized secondly to refine the boundaries by joint codebook vector adjustment between the classes to increase the accuracy of the NN.

More specifically, the goal of the LVQ1 algorithm is to find the output unit (codebook vector) that is closest to the input vector (sensor array input) and adjust the respective weight vector. The closest codebook vector is determined using the Euclidean distance. Then the weight vector of the "winning" codebook vector is repositioned based on the class of both the input vector and the codebook vector. If the input vector and the codebook vector are associated with the same class, the weight vector is moved closer to the input vector. Otherwise, the weight vector is moved further away from the input vector. This reward/punish learning rule has the effect of minimizing the number of misclassifications, by reducing the density of codebook vectors (weighted) close to the decision (i.e. class) boundaries.

The goal of the LVQ2 algorithm is to reposition the closest and next closest codebook vector if the input vector falls out on the wrong side of the decision boundary. In general terms, it should be appreciated that even though the classes are bounded and separated, the boundary itself may take up some dimensional space, such that a processed data input may fall essentially "on" a boundary. The LVQ2 algorithm uses three criteria for determining if repositioning is required. The first criterion is that the class of the closest codebook vector is not the same as the class of the input vector. The second criterion is that the class of the next closest codebook vector is the same as the class of the input vector. The final criterion is that the input vector must fall into the decision (class) boundary. If these criteria are met, the closest codebook vector is moved further away from the input vector and the next closest codebook vector is moved closer to the input vector. This rule has the effect of allowing two weight vectors to learn, thus helping underutilized codebook vector to participate in the learning process.

Figure 8:
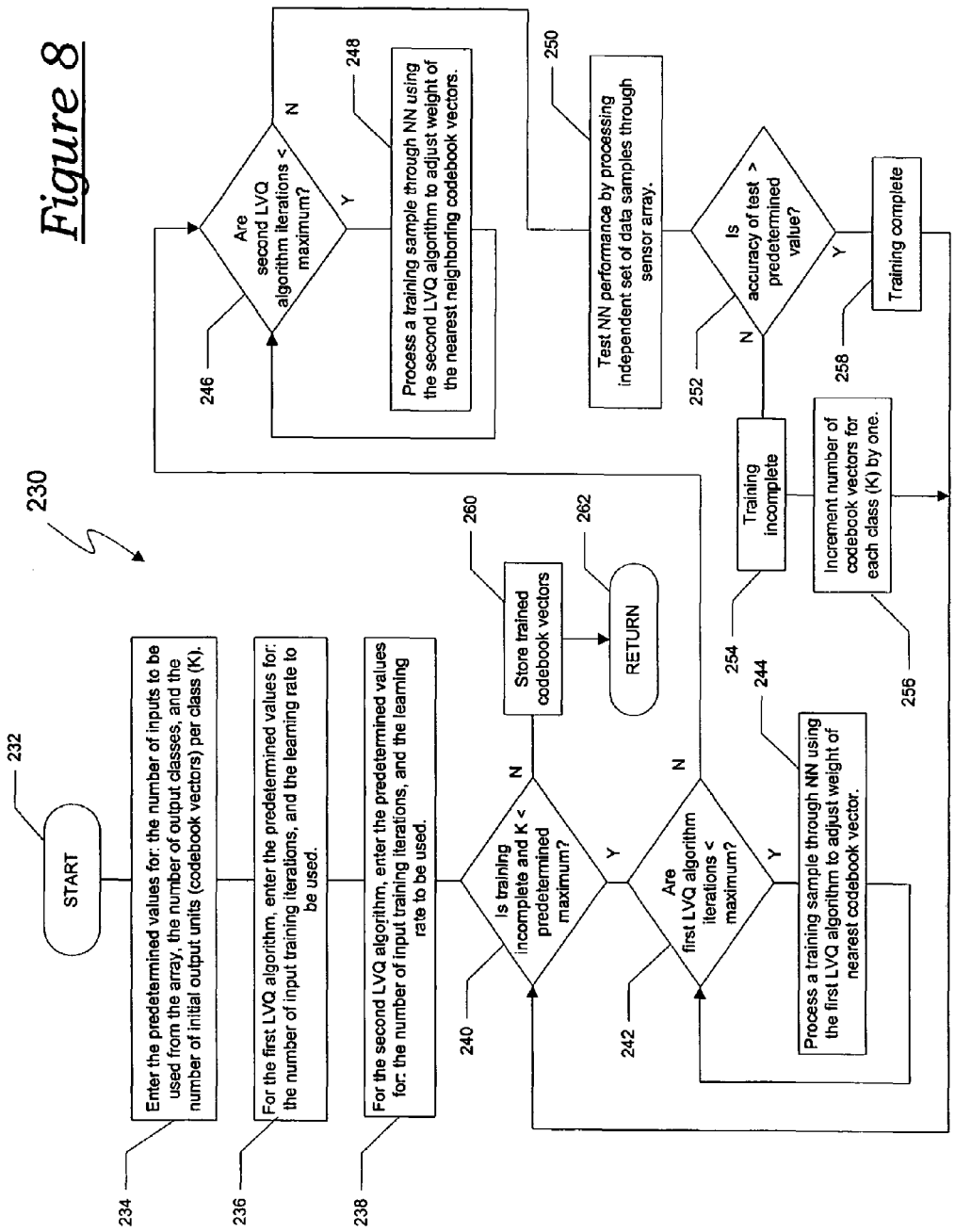
FIG. 8 is a block diagram flowchart of the method of the present invention for supervised training of a neural net of the type that may be employed with the method of the present invention.

The neural network training portion of the method of the present invention is generally indicated at 230 in FIG. 8. The method is initiated at the start entry block 232 and process block 234 continues by initiating the NN. Certain predetermined values that will be used by the NN to process the training data entered into the NN at process block 234. These predetermined values include: the number of inputs (i.e. individual sensors 46) that will be used in the array, the number of output classes, and the number of output units (codebook vectors) per each class (expressed as K). It should be appreciated that the loading of these initial values need not be repeated each time the training method repeats and re-determines an adjustment to the codebook vectors. The method continues at process block 236, at which the first LVQ training algorithm enters the predetermined values for the number of input training iterations and the learning rate that will be used. It should be appreciated that for the various training algorithms used in the related neural net art, it has been determined that there are ranges and optimal values for the number of training inputs (iterations) used and the rate at which the codebook vectors are moved (learning rate).

In the preferred embodiment of the LVQ NN, the "K" codebook vectors (output units) for each class are initially set at two and may increment to five by the time the training iterations are complete. Also, in the preferred embodiment, the training iterations for the LVQ1 training are optimally 1000 although in the related art they may range as high as 10,000. Limitations are set for the number of iterations because in empirical practice it has been found that NNs reach a peak training point then start to degrade in accuracy if the training is continued too long. Further, in the mathematical expression of the LVQ1 algorithm, a learning rate is used to set how far a codebook vector is moved, and thus how fast the NN trains for each training iteration. Limitations are set on this value as well, as it has been empirically shown that too fast a learning rate will cause the adjustments to the codebook vectors to constantly overshoot and cause learning oscillations that will degrade the accuracy of the NN or make it untrainable. In the preferred embodiment, the learning rate for the LVQ1 training is optimally 0.1 although it may range from 0.08 to 0.2.

The method continues at process block 238, and for the second LVQ training algorithm, predetermined values are entered for the number of input training iterations and the learning rate that will be used. In the preferred embodiment, the training iterations for the LVQ2 training are optimally 2000 and the learning rate is optimally 0.08 although in the art it may range from 0.05 to 0.1. Decision block 240 is then reached which serves as a loop point in the method by determining if the training status is set as incomplete and if the K value is less than a predetermined amount. As mentioned above, the maximum K value in the preferred embodiment is five and, in the first pass through the method, the training is incomplete. Thus, the "yes" path is followed to decision block 242.

At decision block 242, it is determined if the first LVQ training algorithm training iterations are less than their maximum. As mentioned above, the LVQ1 iterations are initially set at 1000. Thus, this decision block must be reached 1001 times before the "No" path is taken. Given this consideration, decision block 242 sets up the LVQ1 training loop by taking the "Yes" path through process block 244 until 1000 iterations have been completed. Process block 244 sends a training sample through the NN and the LVQ1 algorithm adjusts the weight of the nearest codebook vector. After the LVQ1 training iterations have incremented to their set value of 1000, the method follows the "No" path to decision block 246. At decision block 246 it is determined if the second LVQ training algorithm training iterations are less than their maximum. As mentioned above, the LVQ2 iterations are initially set at 2000. Thus, this decision block must be reached 2001 times before the "No" path is taken. Given this consideration, decision block 246 sets up the LVQ2 training loop by taking the "Yes" path through process block 248 until 2000 iterations have been completed. Process block 248 sends a training sample through the NN and the LVQ2 algorithm adjusts the weights of the two nearest codebook vectors to the training output. After the LVQ2 training iterations have incremented to their set value of 2000, the method follows the "No" path to decision block 250.

At process block 250, an independent set of data samples are run through the sensor array to test the performance of the NN after this first pass through the LVQ1 and LVQ2 training has been completed. This is a separate set of data inputs different from the training sets used for the LVQ1 and LVQ2 training, and in this method step the codebook vectors are not adjusted. This step is generally referred to as validation with the new input data samples serving as the validation set. The accuracy of the NN in providing the correct classifications for the validation set is compared to a desired predetermined accuracy level in decision block 252. This accuracy value may be set to any value, but in the preferred embodiment the desired accuracy is from 98 to 100%. Generally speaking, though possible, the nature of the LVQ NN will not likely rise to this level of accuracy on the first pass through the training iterations. In that case, the method will follow the "Yes" path from decision block 252 to process block 254. Process block 254 will set the training status as incomplete and process block 256 will increment the number of codebook values per class (K) by one. The method then returns to decision block 240 to determine if the training status is set as incomplete and if the K value is less than a predetermined amount. As mentioned above, the maximum K value in the preferred embodiment is 5 and in the second pass through the method steps, the K value is now 3 with the training status still incomplete. Thus, the "yes" path is followed back to decision block 242.

In this manner, it can be seen that the LVQ1 and LVQ2 training iterations will be repeated in process blocks 244 and 248 until the desired accuracy is reached at decision block 252. Once this occurs the "Yes" path will be followed from decision block 252 to process block 258. Process block 258 will set the training status to complete and the method will return to decision block 240. At this point, the determination that the training is incomplete with a K value less than the predetermined maximum at decision block 240 will cause the "No" path to be taken to process block 260 which stores the finalized, weighted, codebook vectors. Finally, the end return block will cause the method to exit the training process. It should be appreciated that the decision criteria at decision block 240 allows the "No" path to also be taken if the training remains incomplete but the K value is incremented beyond its predetermined maximum. In this case, the finalized weighted codebook vectors will still be stored. However, the training process will have failed to cause the NN to reach the desired accuracy. When this occurs, the learning rates or the iteration numbers may have to be adjusted and the NN retrained. In this way, the present invention overcomes the limitations of the current methods of pattern recognition and classification for vehicle seat occupancy that use neural nets by providing a control method that employs a trained neutral net having a learning vector quantization algorithm. In addition, the method of the present invention overcomes the limitations of the current methods by properly training a NN with an LVQ algorithm to provide accurate pattern recognition and occupancy classification for a vehicle seat having an occupancy sensing system.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of recognizing and classifying a physical presence occupying a vehicle seat having a occupancy sensing system including an array of sensors having output, said method including the steps of:
    sensing the output of an array of sensors that detect a physical presence in a seat;
    applying the sensor array output as a vector representation to a neural net that was trained using a learning vector quantization algorithm; and
    recognizing the sensor array output as falling within one of a group of predetermined classification patterns that represent a physical presence in the seat defined by size, weight, and physical orientation.

2. A method as set forth in claim 1, wherein the step of recognizing the sensor array output further includes the step of continuously reinitiating the method steps to redetermine the classification pattern.

3. A method as set forth in claim 1, wherein said method further includes the first steps of
    entering into the neural net the predetermined value of the number of inputs that will be used in the sensor array;
    entering into the neural net the predetermined value of the number of inputs that will be used in the sensor array;
    entering into the neural net the predetermined number of output classes;
    entering into the neural net the predetermined number of output units for each output class; and
    entering into the neural net the trained output units.

4. A method as set forth in claim 1, wherein the step of recognizing the sensor array output further includes the steps of:
    calculating the Euclidean distance from the sensor array output value to each of the output units of the neural net;
    determining the nearest output unit to the sensor array output value;
    determining the occupant classification that is associated with the said nearest output unit; and
    outputting the determined classification to a higher level control system.

5. A method of recognizing and classifying a physical presence occupying a vehicle seat having a occupancy sensing system by training a neural network, said method including the steps of:
    determining the number of times to process a training set of input values through a neural network for a first learning vector quantization algorithm;
    determining the number of times to process a training set of input values through a neural network for a second learning vector quantization algorithm;
    processing the training set of input values through the neural network the determined number of times using said first learning vector quantization algorithm so as to provide output units of the neural network;
    adjusting one of the output units of the neural net each time one of said training set of input values is processed using said first learning vector quantization algorithm;
    processing the training set of input values through the neural network the determined number of times using said second learning vector quantization algorithm;
    adjusting two of the output units of the neural net each time one of said training samples is processed using said second learning vector quantization algorithm; and
    storing the adjusted output units as the final trained values for the neural net.

6. A method as set forth in claim 5, wherein the step of processing the set of training samples using said first learning vector quantization algorithm further includes the step of determining the number of times to process a training set of input values through a neural network for a first learning vector quantization algorithm.

7. A method as set forth in claim 5, wherein the step of processing the set of training samples using said second learning vector quantization algorithm further includes the step of determining the number of times to process a training set of input values through a neural network for a second learning vector quantization algorithm.

8. A method as set forth in claim 5, wherein said method further includes the first steps of
    determining the number of desired classifications of occupants; and
    determining the initial output units to have in each of the desired classes.

9. A method as set forth in claim 5, wherein the step of storing the adjusted output units further includes the step of processing a set of input values through the neural net to test the performance of the neural net after the output units have been adjusted.

10. A method as set forth in claim 9, wherein the step of processing a set of input values through the neural net to test the performance of the neural net further includes the step of comparing the accuracy of the neural net to a predetermined value.

11. A method as set forth in claim 10, wherein the step of comparing the accuracy of the neural net to a predetermined value further includes the step of incrementing the number of output units for each classification by one.

12. A method of recognizing and classifying a physical presence occupying a vehicle seat having a occupancy sensing system including an array of sensors having analog output, said method including the steps of:

sensing the analog output of an array of sensors that detect a physical presence in a seat;

converting the analog output of the array of sensors into a digital vector expression;

applying the digital vector expression to a trained neural net having a predetermined learning vector quantization algorithm;

recognizing the output from the neural net as belonging to one of a variety of predetermined patterns representative of a physical presence in the seat;

determining which one of a predetermined series of classifications defined by size, weight, and physical orientation that the recognized pattern belongs to; and continuously reinitiating the method steps to redetermine the classification.

* * * * *